United States Patent [19]

Yamanaga et al.

[11] Patent Number: 4,542,576
[45] Date of Patent: Sep. 24, 1985

[54] REPLACEABLE HEAD MULTI-SPINDLE FASTENING APPARATUS

[75] Inventors: Junichi Yamanaga, Fujimi; Shiro Naito, Hidaka, both of Japan

[73] Assignee: Honda Giken Kogyo Kabushiki Kaisha, Tokyo, Japan

[21] Appl. No.: 517,260

[22] Filed: Jul. 26, 1983

[51] Int. Cl.[4] .................. B21D 39/00; B23Q 3/157
[52] U.S. Cl. .................. 29/568; 81/57.22; 81/57.36; 408/35
[58] Field of Search .............. 29/26 A, 40, 42, 568, 29/426.3; 408/35; 409/144, 217, 230; 81/57.5, 57.22, 57.36

[56] References Cited

U.S. PATENT DOCUMENTS

| 2,807,972 | 10/1957 | Mitchell | 81/57.36 |
| 3,858,286 | 1/1975 | Nohejl | 29/26 A |
| 3,964,154 | 6/1976 | Auer | 81/57.22 X |
| 4,216,572 | 8/1980 | Matsushita et al. | 29/568 |
| 4,354,306 | 10/1982 | Ida et al. | 29/568 |

FOREIGN PATENT DOCUMENTS 1628025 11/1971 Fed. Rep. of Germany ..... 81/57.22

*Primary Examiner*—Z. R. Bilinsky
*Attorney, Agent, or Firm*—Armstrong, Nikaido, Marmelstein & Kubovcik

[57] ABSTRACT

A fastening apparatus which includes a supporting column with a working station installed on one side at the lower end thereof. Upper and lower annular rails are supported on and coaxially surround the upper portion of the column with a portion of the annular rails being vertically movable. Plural multi-spindle fastening heads are supported on the rails and movable circularly there around. An indexing device is mounted on the upper portion of the column for selectively engaging in moving a desired one of the heads to a position above the working station where the vertically movable portion of the annular rails is provided. A connecting head supported by the upper portion of the column is engageable with the fastening head that is positioned over the working station for supplying power thereto from a separate power source. The movable portion of the annular rails raises and lowers the selected fastening head to perform the fastening operations on the work piece at the working station.

1 Claim, 4 Drawing Figures

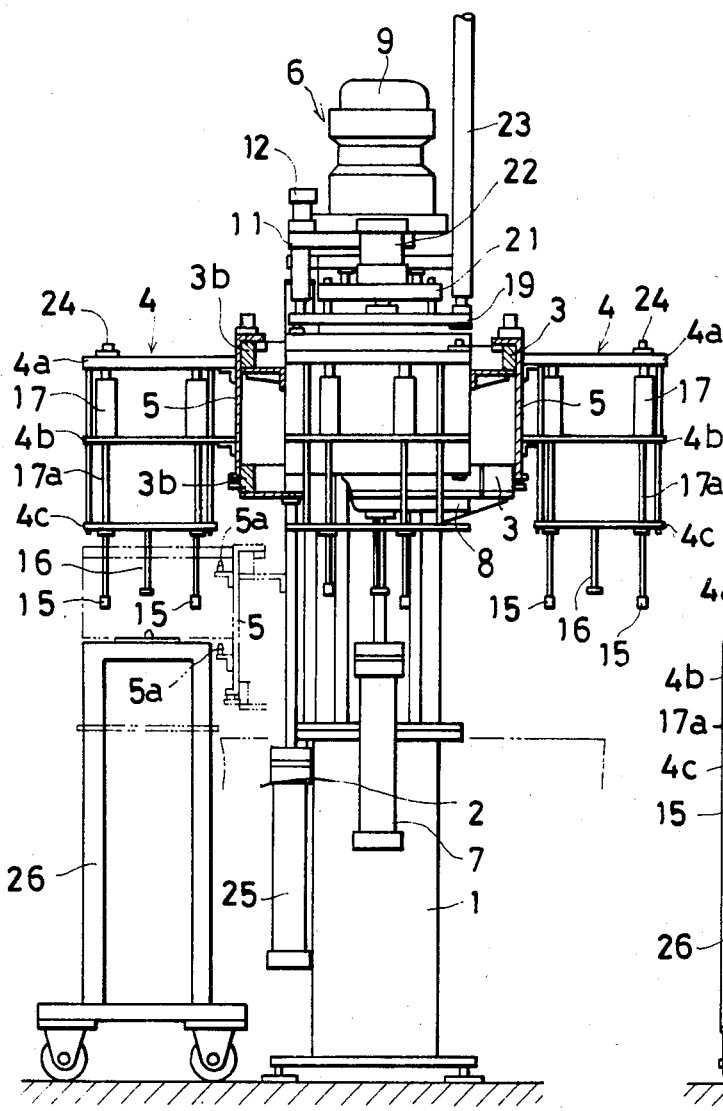
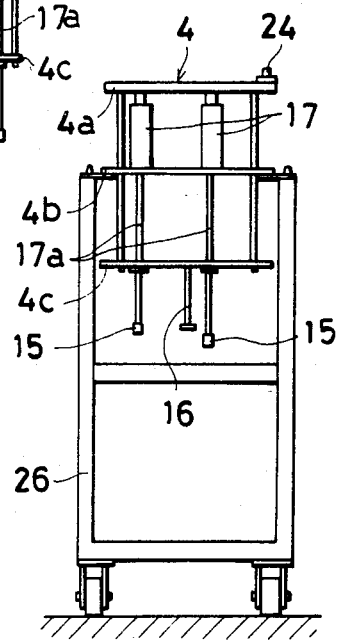
FIG.3
FIG.4

REPLACEABLE HEAD MULTI-SPINDLE FASTENING APPARATUS

BACKGROUND OF THE INVENTION

This invention relates to a multi-spindle fastening apparatus having a fastening head which is used for performing simultaneous fastening operations to a workpiece having plural portions to be fastened, and is more particularly directed to such an apparatus having plural replaceable heads wherein a selected one of the plural heads is replaceable with another in compliance with a change in kind or type of workpiece.

An apparatus of this kind has been known wherein a head is detachably provided on a machine base so that the head can be manually detached therefrom and/or replaced with another as an occasion demands. Further, another apparatus is known wherein plural heads are fixedly disposed on a machine base and the workpiece is supplied to one of the plural working stations below a corresponding one of the heads. However, the former machine has the disadvantage that it is troublesome to replace the heads, and the latter machine has the disadvantage that it is necessary for each head to have an independent working station supplied with the respective workpiece of a different kind to be worked on by that particular head. Consequently, a large space for installation of those stations is required.

SUMMARY AND OBJECT OF THE INVENTION:

It is an object of the present invention to provide a multi-spindle fastening apparatus having a plurality of heads which can easily be replaced as the occasion demands.

It is a further object to provide a multi-spindle fastening apparatus operating at one work station so that respective work pieces of different kinds can be worked on at that one station easily.

It is still a further object of the present invention to provide a replacable head multi-spindle fastening apparatus which does not take up a large amount of room for installation.

These and other objects are obtained in a fastening apparatus which includes a supporting column having an upper portion and a lower portion. The working station is installed on one side of the lower portion of the column. Upper and lower annular rail means are supported on and coaxially surround the upper portion of the column. Plural multi-spindle fastening heads are supported on the upper and lower annular rail means and are movable circularly thereon round the column. Index means are mounted on the upper portion of the column for selectively engaging in moving a desired one of the fastening heads to a position above the working station. A connecting head means is supported by the upper portion of the column and is engagable with the fastening head positioned over the working station for supplying power thereto from a separate power source. The upper and lower annular rail means comprise first movable rail means positioned adjacent the working station for raising and lowering the desired one of the fastening heads to an operating position at the working station for performing fastening on a work piece.

The apparatus can further comprise a replacing carrier. The plural multi-spindle fastening heads can be detachably supported on the upper and lower annular rail means through respective frame bases. The upper and lower annular rail means can further comprise second movable rail means at a position away from the working station for raising and lowering one of the fastening heads to a position for being attached to or detached from the apparatus. The lowered head can be received on the replacing carrier.

BRIEF DESCRIPTION OF THE DRAWINGS

The above and other objects and the intended advantages of the present invention will become readily apparent by reference to the following detailed description when considered in conjunction with the accompanying drawings wherein:

FIG. 3 is a front view, partially in section; and

FIG. 4 is a side view of a replacement carrier for a multi-spindle fastening head of the present invention.

DETAILED DESCRIPTION OF A PREFERRED EMBODIMENT

Figure 1:
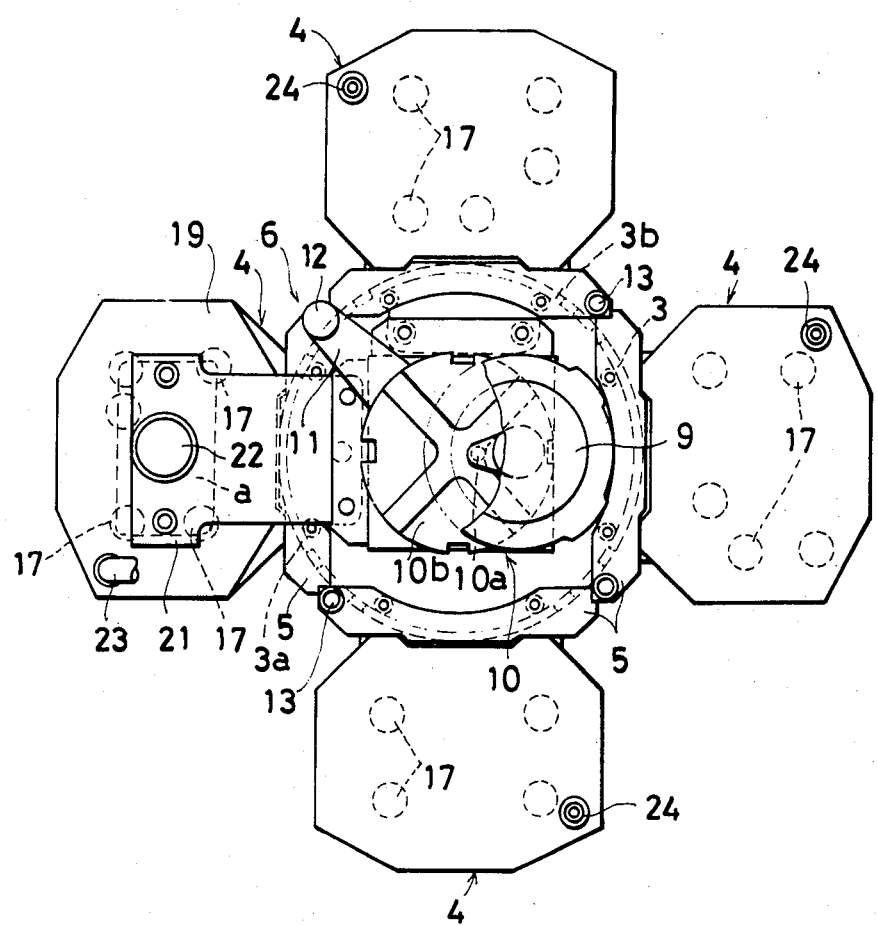
FIG. 1 is a top plan view, partially omitted, of one embodiment of the present invention.

One embodying example of this invention will be explained with reference to the accompanying drawings:

Referring to the drawings, a working station 2, is installed in front of a lower portion of a supporting column 1. A pair of upper and lower annular rails 3 are provided around an upper portion of the supporting column 1. Plural multi-spindle fastening heads 4, that is four such heads for instance, are disposed and supported on the annular rails 3, 3 through respective frame bases 5 and are movably circularly therealong. A portion of both of the annular rails 3, 3 are constructed by movable rails 3a, 3a which are movable upwards and downwards. The movable rails 3a, 3a are positioned at the front of the support column 1 so that any desired one of the plural multi-spindle fastening heads 4 may be selected and lowered to be positioned at the working station 2 by a downwards movement of the movable rails 3a, 3a. The desired head 4 is moved to be positioned on the movable rails 3a, 3a by an index means 6 provided on a top portion of the supporting column 1.

Figure 2:
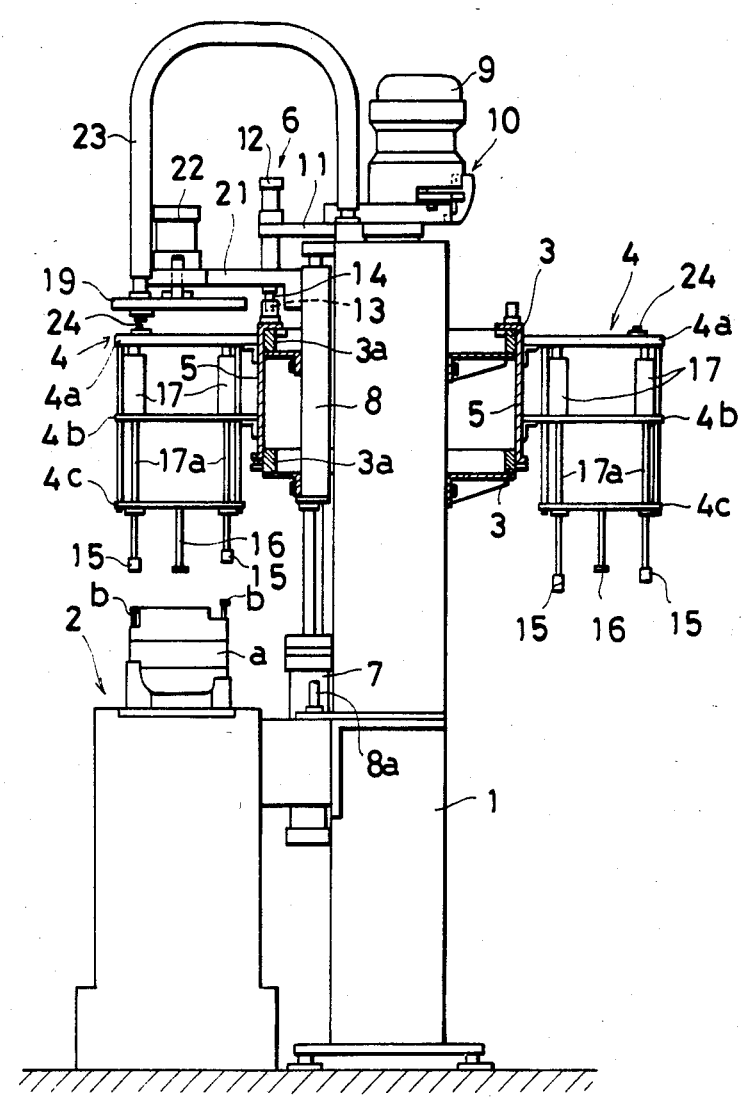
FIG. 2 is a partial sectional side view.

More in detail, the movable rails 3a, 3a are attached, as shown clearly in FIG. 2, to an elevating base 8 provided along a front surface of the supporting column 1. They are arranged to be movable upwards and downwards by an elevating cylinder 7 together with the elevating base 8. The index means 6 comprises, as shown clearly in FIGS. 1 and 2, a Geneva mechanism 10 composed of a Geneva pin 10a to be driven by an electric motor 9 and a Geneva gear 10b engaged therewith. An index arm 11 is connected to the Geneva gear 10b and carries a cylinder 12 having an engaging pin 14. The pin 14 is arranged to be mounted removably in a pin opening 13 made in a upper surface of each frame base 5. A proper head 4 corresponding to the kind of workpiece a supplied to the working station 2, is selected from the heads 4 and is positioned on the movable rails 3a, 3a by the index arm 11 being, first, turned through the Geneva mechanism 10 to be positioned just over the frame base 5 having the multi-spindle fastening head 4 corresponding to the workpiece a. Then the engaging pin 14 is inserted into the pin opening 13 of the frame base 5 of the desired head 4 by the cylinder 12. Under this engaging condition, the index arm 11 is turned back to the original position, so that the head 4 thus selected is positioned on the movable rails 3a, 3a.

Referring to the drawings, numeral 8a denotes a guide bar for the elevating base 8.

Each of the multi-spindle fastening heads 4 is provided with an upper plate 4a, a middle plate 4b and a lower plate 4c which is so supported as to be movable upwards and downwards and be always urged downwards by a spring (not shown). Sockets 15 adapted to be applied to respective fastening openings made in the workpiece a are provided below the lower plate 4c. A work pusher 16 which is to be brought into abutment with the workpiece a is provided on a lower surface of the lower plate 4c. Respective nut runners 17 of air-driven type are connected to the respective sockets 15 through respective rotary shafts 17a passing slidably through holes made in the lower plate 4c. The runners 17 are provided between the upper plate 4a and the middle plate 4b so that if the selected head 4 is lowered the work pusher 16 is first brought into abutment with the workpiece a thereby restraining further lowering of the lower plate 4c. If the head 4 is further lowered, the respective rotary shafts 17a are further lowered and the respective sockets 15 on the lower ends of the respective rotary shafts 17a engage with head portions of bolts b previously applied to the respective fastening openings of the workpiece a. The nut runners 17 are operated and screw the respective bolts b into the respective fastening openings of the workpiece a.

Referring to the drawings, a connecting head 19 is interconnectable between a power source comprising a compressed air source (not illustrated) and the multi-spindle fastening head 4 selected on the movable rails 3a,3a, and is supported on the piston of a connecting cylinder 22 on a supporting base 21 attached to an upper end portion of the elevating base 8 as to be movable upwards and downwards between its lower connecting position and its upper release position. An air tube 23 extending from the compressed air source is connected to the connecting head 19. The upper plate 4a of the multi-spindle fastening head 4 is provided with a single common air supply joint 24 connected to the respective nut runners 17 so that if the connecting head 19 is lowered to a connecting position, the air tube 23 may be connected therethrough to the air supply joint 24.

Each of the multi-spindle fastening heads 4 is so mounted and supported at the upper plate 4a and the middle plate 4b thereof on upper and lower pins 5a, 5a of each corresponding frame base 5 attached to the rail means 5a, 5a as to be upwardly detachable from the pins. Another portion of the annular rails 3, 3, that is, the left portion thereof, for instance, as shown in FIG. 3, can be constructed of further movable rails 3b, 3b which are movable upwards and downwards by a second elevating cylinder 25 for attaching and detaching. The further movable rails are used for attaching and detaching of the head 4, so that in the midst of the lowering of the movable rails 3b, 3b, the middle plate 4a of the multi-spindle fastening head 4 on the movable rails 3b, 3b can be received by a replacing carrier 26, as shown in FIG. 4. If the rails 3b, 3b are further lowered, the engagement between the head 4 and the pins 5a, 5a is released. Thereafter, a new head carried by another replacing carrier can be attached to the rails 3b, 3b by raising the rails 3b, 3b, and thus the attaching and detaching operations for replacement of the heads can be performed.

Next, the operation of this invention apparatus will be explained as follows:

After the multi-spindle fastening head 4 corresponding to the kind of workpiece a supplied to the working station 2 is elected and positioned on the movable rails 3a, 3a by the foregoing turning and returning operations of the index means 6, the connecting head 19 is lowered to the connecting position. The air tube 23 connected to the compresssed air source is connected therethrough to the air supply joint 24. The movable rails 3a, 3a are lowered by lowering of the cylinder 7 thereby lowering the multi-spindle fastening head 4 selected on the rails 3a, 3a together with the connecting head 19 towards the workpiece a on the working station 2. Thereafter the fastening operations of the nut runners 17 of the head 4 are performed on the workpiece a. Thereafter, if the movable rails 3a, 3a are moved upwards by the upward movement of the cylinder 7, the head 4 is moved upwards for being ready to permit a new workpiece to be supplied to the working station 2 for the next working operation.

If the workpiece next supplied thereto is of a different kind, the connecting head 19 is moved upwards to the release position, and the head 4 previously positioned on the movable rails 3a, 3a is moved away from the movable rails 3a, 3a. Another multi-spindle fastening head 4 corresponding to the next workpiece is selected and moved to be positioned on the movable rails 3a, 3a by the operation of the index means 6. Thereafter almost the same operations as described above are carried out so that the fastening operations of the head are performed on the workpiece.

Thus, according to this invention, plural multi-spindle fastening heads are disposed and supported on an annular rail means provided around the supporting column. Any proper one of these multi-spindle fastening heads in compliance with a workpiece to be fastened is selected for position on a movable rail means which is a part of the annular rail means. A power source is connected through a connecting head to the selected multi-spindle fastening head. Fastening operations of the selected fastening head are performed on the workpiece by lowering of the movable rails, so that it can be carried out simply and reliably to select and operate the multi-spindle fastening head corresponding to the workpiece. Additionally it is enough to install a working station only at a single place corresponding to the location of the movable rail means, so that a space for installation thereof can be decreased. Furthermore the power source is enough with providing a single common one corresponding to the connecting head. Thus the foregoing disadvantages of the conventional apparatus can be surely eliminated.

It is readily apparent that the above-described replaceable head multi-spindle fastening apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A fastening apparatus comprising:
a supporting column, having an upper portion and a lower portion, a working station installed on one side of the lower portion column, upper and lower annular rail means supported on and coaxially surrounding the upper portion of the column, plural multi-spindle fastening heads supported on the lower annular rail means and movable circularly thereon around said column on respective frame bases, index means mounted on the upper portion of the column for selectively engaging and moving a desired one of the fastening heads to a position above the working station, a connecting head means supported by the upper portion of the column engageable with the fastening head positioned over the working station for supplying power thereto from a separate power source, and a replacing carrier;

the upper and lower annular rail means comprising first movable rail means positioned adjacent the working station for raising and lowering the desired one of the fastening heads to an operating position at the working station for performing fastening on a workpiece, and second movable rail means at a position away from the working station for raising and lowering another desired one of the fastening heads to a position for being attached to or detached from the apparatus, the lowered head being received on the replacing carrier.

* * * * *